United States Patent [19]

Smith et al.

[11] Patent Number: 5,016,912
[45] Date of Patent: May 21, 1991

[54] TRAILER SUSPENSION APPARATUS

[75] Inventors: Earl D. Smith, Scottsdale; Josef P. deFazekas, Fountain Hills; Herbert E. Cooper, Scottsdale, all of Ariz.

[73] Assignee: DBX Corporation, Scottsdale, Ariz.

[21] Appl. No.: 503,307

[22] Filed: Apr. 2, 1990

Related U.S. Application Data

[63] Continuation of Ser. No. 314,812, Feb. 22, 1989, Pat. No. 4,934,733.

[51] Int. Cl.⁵ .............................................. B60G 11/26
[52] U.S. Cl. .................................... 280/711; 280/688; 280/713
[58] Field of Search .............. 280/702, 709, 711, 804, 280/682, 688, 714, 705, 690, 6.1, 840, 698

[56] References Cited

U.S. PATENT DOCUMENTS

| | | | |
|---|---|---|---|
| 2,507,980 | 5/1950 | Knapp | 280/124 |
| 3,078,104 | 2/1963 | Chalmers | 280/124 |
| 3,130,688 | 4/1964 | Gutridge et al. | 105/268 |
| 3,140,880 | 7/1964 | Masser | 280/124 |
| 3,181,877 | 5/1965 | McHenry | 280/840 |
| 3,210,047 | 10/1965 | Moye | 214/506 |
| 3,282,603 | 11/1966 | Barth | 280/106 |
| 3,356,386 | 12/1967 | Taylor | 280/189 |
| 3,704,898 | 12/1972 | Schmidt | 280/124 |
| 3,746,363 | 7/1973 | Borns | 280/124 |
| 3,773,348 | 11/1973 | Davis | 280/124 |
| 3,829,118 | 8/1974 | Gouirand | 280/106.5 R |
| 3,880,445 | 4/1975 | Chieger | 280/106 |
| 3,884,502 | 5/1975 | Wagner | 280/423 |
| 4,032,167 | 6/1977 | Chereda | 280/789 |
| 4,063,611 | 12/1977 | Anderson | 280/708 |
| 4,095,818 | 6/1978 | Smith | 280/789 |
| 4,166,640 | 9/1979 | Van Denberg | 280/711 |
| 4,202,564 | 5/1980 | Strader | 280/678 |
| 4,252,340 | 2/1981 | Egging | 280/682 |
| 4,422,667 | 12/1983 | Perry | 280/705 |
| 4,427,213 | 1/1984 | Raidel, Jr. | 280/711 |
| 4,465,298 | 8/1984 | Raidel, Sr. | 280/711 |
| 4,468,739 | 8/1984 | Woods et al. | 280/707 |
| 4,470,615 | 9/1984 | Scheuerle | 280/702 |
| 4,541,653 | 9/1985 | Raidel | 280/711 |
| 4,558,886 | 12/1985 | Straub | 280/711 |
| 4,580,798 | 4/1986 | Roelofs | 280/840 |
| 4,593,930 | 6/1986 | Davis | 280/690 |
| 4,615,539 | 10/1986 | Pierce | 280/690 |
| 4,619,578 | 10/1986 | Routledge | 280/711 |
| 4,666,181 | 5/1987 | Wegner | 280/711 |
| 4,677,263 | 6/1987 | Hamilton et al. | 280/DIG. 1 |
| 4,718,692 | 1/1988 | Raidel | 280/713 |
| 4,736,958 | 4/1988 | Armstrong | 280/711 |
| 4,736,965 | 4/1988 | Smith | 280/714 |

Primary Examiner—Richard A. Bertsch
Attorney, Agent, or Firm—Woodard, Emhardt, Naughton, Moriarty & McNett

[57] ABSTRACT

A wheel suspension system 10 is disclosed which includes a wheel support member 14 pivotally mounted to a vehicle frame 12, a wheel 11 rotatably mounted to the support member 14 on a stub axle 16, and an airbag 18 positioned between the wheel support member 14 and the vehicle frame 12 to bias the support member 14 into an intermediate position between a lowermost position and an uppermost position, the rotational axis 17 of the wheel 11 being positioned at or above the cargo floor 26 of the vehicle at least when the wheel support member 14 is in the uppermost position. The suspension system 10 aligns the pivot point 33, wheel mount 16, and airbag 18 to provide a compact lateral profile, thus providing maximum distance between the wheels 11 and permitting the cargo floor 26 to be supported between the wheels 11, and in some instances below the rotational axis 17 of the wheels 11. The wheel support members 14 are typically mounted in one, two or three pairs on opposite sides of the vehicle, either as the exclusive wheels 11 on a trailer, or as the rear wheels 11 of a front wheel drive van or similar vehicle.

26 Claims, 8 Drawing Sheets

TRAILER SUSPENSION APPARATUS

This application is a continuation of application Ser. No. 314,812, filed Feb. 22, 1989, issued on July 19, 1990 as U.S. Pat. No. 4,934,733.

BACKGROUND OF THE INVENTION

1. Field of the Invention

This invention relates to the field of wheel suspensions, and particularly to wheel suspension systems that independently support the wheels of a trailer, semi-trailer or other vehicle in which a wide and low cargo floor is desired.

2. Description of the Prior Art

Virtually every commodity in the market today is, at one time or another, transported by truck, often in a tractor-trailer rig. For long distance transport, the trailer, or semi-trailer as it is often called, is frequently carried by rail car.

It is axiomatic that the larger the cargo space for a fully loaded van or trailer, the lower the per-mile transportation cost for the transported commodities. There are factors, however, which limit van and trailer size. Various governmental regulations dictate the maximum dimensions of highway vehicles. And, of course, for trailers being transported by rail, the dimensions of the standardized rail car dictate the maximum dimensions of the trailer.

In the most common form of piggyback trailer rail transport, each rail car carries two trailers. The standard rail-transportable trailer has a maximum length of approximately 45 feet, a maximum width of approximately 102 inches, and a height above the ground of approximately 162 inches. For these reasons mentioned above, these dimensions are not to be exceeded. It is, thus, impractical to increase cargo space by increasing the overall dimensions of the trailer.

Heretofore, in most rail-transportable trailers, the floor of the cargo space, i.e., the bottom of the trailer body, is several feet off the ground to clear the rear wheels, axles, and suspension of the tractor and the rearwardly disposed wheels and suspension of the trailer.

The introduction of airbag suspension systems for tractor-trailer rigs has somewhat reduced the distance between the trailer floor and the road surface required to clear the tractor and trailer suspension systems. But the increase in cargo capacity of trailers so equipped has been quite small. U.S. Pats. No. 3,078,104, granted Feb. 19, 1963, to W. G. Chalmers for INDEPENDENT REAR SUSPENSION FOR SEMI-TRAILERS, and No. 3,140,880, granted July 14, 1964, to L. D. Masser for SUSPENSION FOR AUTOMOTIVE VEHICLES, show representative pneumatic suspension systems.

It has also been proposed to utilize some of the space between the ground and the bottom of the trailer body by equipping the body with a depending support structure between the wheels of the trailer and the wheels of the tractor to gain auxiliary cargo space. U.S. Pat. No. 3,884,502, granted May 20, 1975, to R. F. Wagner for SEMITRAILER OR THE LIKE, discloses a trailer with this modification. The disadvantage here is that, although the additional support structure adds cargo space, that space is not in communication with the interior of the trailer and, therefore, does not increase the size of the main cargo compartment. The size of commodities that can be carried remains restricted.

Another approach to increasing the cargo capacity of trailers has been the use of the so-called "drop frame" for the trailer body. In this construction, the floor of the cargo compartment is dropped close to the road surface between the suspension apparatus of the tractor and the suspension apparatus of the trailer and also possibly for a short distance to the rear of the trailer suspension. Again, the cargo capacity has been increased, but there are shortcomings to this design. Principal among these is the hump, or rise, in the floor of the cargo compartment required to clear the wheels, axles, and suspension components of the trailer. This makes it impossible to load the trailer with a forklift truck through the rear door of the trailer from a conventional loading dock. The addition of doors to the sides of the trailers, of course, increase the cost of the trailer, and those doors often are not accessible from the loading dock.

U.S. Pat. No. 4,619,578, granted Oct. 28, 1986, to J. H. Routledge for RETRACTABLE WHEEL SUSPENSION APPARATUS, discloses an interesting arrangement for utilizing the space between opposite wheel assemblies of a container carrier. The tractor disclosed in that patent pulls a horizontally disposed, U-shaped frame which is open at the rear so that the frame can be backed under and around a container. The two legs of the frame are supported by pneumatic suspension systems whereby the wheels of one leg are suspended independently of the wheels on the opposite leg. Because there are no through-axles between the wheels on one frame leg and the wheels on the other leg, the space between the opposite wheels can be occupied by the cargo container. The system disclosed in the Routledge Patent is simply too complex and too expensive to be utilized on the common transport trailer.

In U.S. Pat. No. 4,032,167 issued to Chereda on June 28, 1977, there is disclosed a trailer for transporting motorcycles. The Chereda trailer includes a rigid, horizontal frame upon which is mounted a pair of opposed wheels. The two wheels are secured to fixed spindles bolted to the frame. No provision is made for suspending the wheels other than by this rigid attachment, and the Chereda trailer would therefore suffer from the disadvantages of the rigid mounting of the wheels to the load-carrying frame. Heavy vehicle suspension is described in U.S. Pat. No. 4,718,692 issued to Raidel on Jan. 12, 1988. The Raidel suspension is typical of prior art systems which use pairs of pivoting arms to support a through axle that extends the width of the vehicle below the vehicle frame.

One of the problems confronting the prior art has been the lack of strength and stability for suspension systems which do not include full-width axles. Devices such as the Chereda trailer have been suitable for light-load applications, but are not practical for heavy use since the rigid attachment of the wheels to the trailer frame cause considerable forces to be transmitted to the frame. Conversely, the pivoting arm suspensions, such as in the Raidel system, have been found applicable to heavy use when incorporating a through axle. Absent the through axle, however, the pivoting arm devices of the prior art have not been designed to provide adequate strength and stability, particularly in terms of the lateral forces transmitted to the suspension upon turning of the vehicle.

Various other devices have been proposed in the prior art, which are characterized by the foregoing limitations. In U.S. Pat. Nos. 4,580,798 issued to Roelofs on Apr. 9, 1986, there is described an air suspension system for the rear end of a motor home. As with similar prior art devices, the Roelofs suspension system includes a pivoting arm for support of the wheel which is mounted to a through axle. Comparable devices including axles extending underneath the vehicle frame are disclosed in U.S. Pat. No. 4,060,145 issued to Kingman, et al. on Nov. 29, 1977; 3,214,047 issued to Moye on Oct. 26, 1965; 4,422,667 issued to Perry on Dec. 27, 1983; 4,666,181 issued to Wagner on May 19, 1987; 4,063,611 issued to Anderson on Dec. 20, 1977; 3,704,898 issued to Masser on Schmadt on Dec. 5, 1972; 3,140,880 issued to Masser on July 14, 1964; 3,884,502 issued to Wagner on May 20, 1975; 4,619,578 issued to Routledge on Oct. 28, 1986; and 3,829,118 issued to Gouirand on Aug. 13, 1974.

An underslung wheel suspension system including a pivoting arm supporting a wheel on a spindle is described in U.S. Pat. No. 3,356,386 issued to Taylor on Dec. 5, 1967. The trailer frame including wheel secured to elevated end portions of a drop axle is described in U.S. Pat. No. 4,095,818 issued to Smith on June 20, 1978. In U.S. Pat. No. 3,282,603 issued to Barth on Nov. 1, 1966, there is described a vehicle frame which includes independently mounted wheels rotatably mounted onto supports rigidly fixed to the vehicle frame. Other independent wheel suspensions utilizing pivoting arms for supporting the wheels are described in U.S. Pat. Nos. 2,507,980 issued to Knapp on May 16, 1950; and 3,078,104 issued to Chalmers on Feb. 19, 1963.

Other vehicle suspension assemblies are described in U.S. Pat. Nos. 4,736,965 issued to Smith on Apr. 12, 1988; 3,773,348 issued to Davis on Nov. 20, 1973; 4,468,739 issued to Woods, et al on Aug. 28, 1984; 3,746,363 issued to Borns on July 17, 1973; and 4,470,165 issued to Scheuerle on Sept. 11, 1984.

There continues to be a need, therefore, for a trailer suspension apparatus which will permit the floor of the trailer body to be lowered closer to the roadway surface and to be substantially flat from the rear of the trailer through the wheel region of the trailer.

SUMMARY OF THE INVENTION

Briefly describing one aspect of the present invention, there is provided a wheel suspension system including a wheel support member mounted to a vehicle frame and movable between an uppermost position and a lowermost position, a wheel rotatably mounted to the wheel support member, and biasing means for biasing the wheel support member to an intermediate position between the uppermost and lowermost positions, the rotational axis of the wheel being at or above the top surface of the vehicle cargo floor at least when the wheel support member is in the uppermost position. The invention may include up to three pairs of wheel suspensions systems in a particular vehicle, and the vehicle may include a trailer only having wheels supported by the claimed suspension system, or a powered vehicle such as a front-wheel drive van having wheels supported by suspension systems other than of the present invention.

It is an object of the present invention to provide a wheel suspension system which permits the suspended wheel to be in a position with its rotational axis at or above the cargo floor of the vehicle.

It is a further object of the present invention to provide a wheel suspension system which is highly compact, and permits a maximum width of cargo space between the suspended wheels.

Another object of the present invention is to provide a wheel suspension system which is reliable and durable, and which is relatively simple in construction.

A further object of the present invention is to provide a vehicle having a cargo floor which is relatively close to the ground, and which has maximum width between the rear wheels.

Further objects and advantages of the present invention will be apparent from the description of the preferred embodiments which follows.

DESCRIPTION OF THE PREFERRED EMBODIMENT

Figure 1:
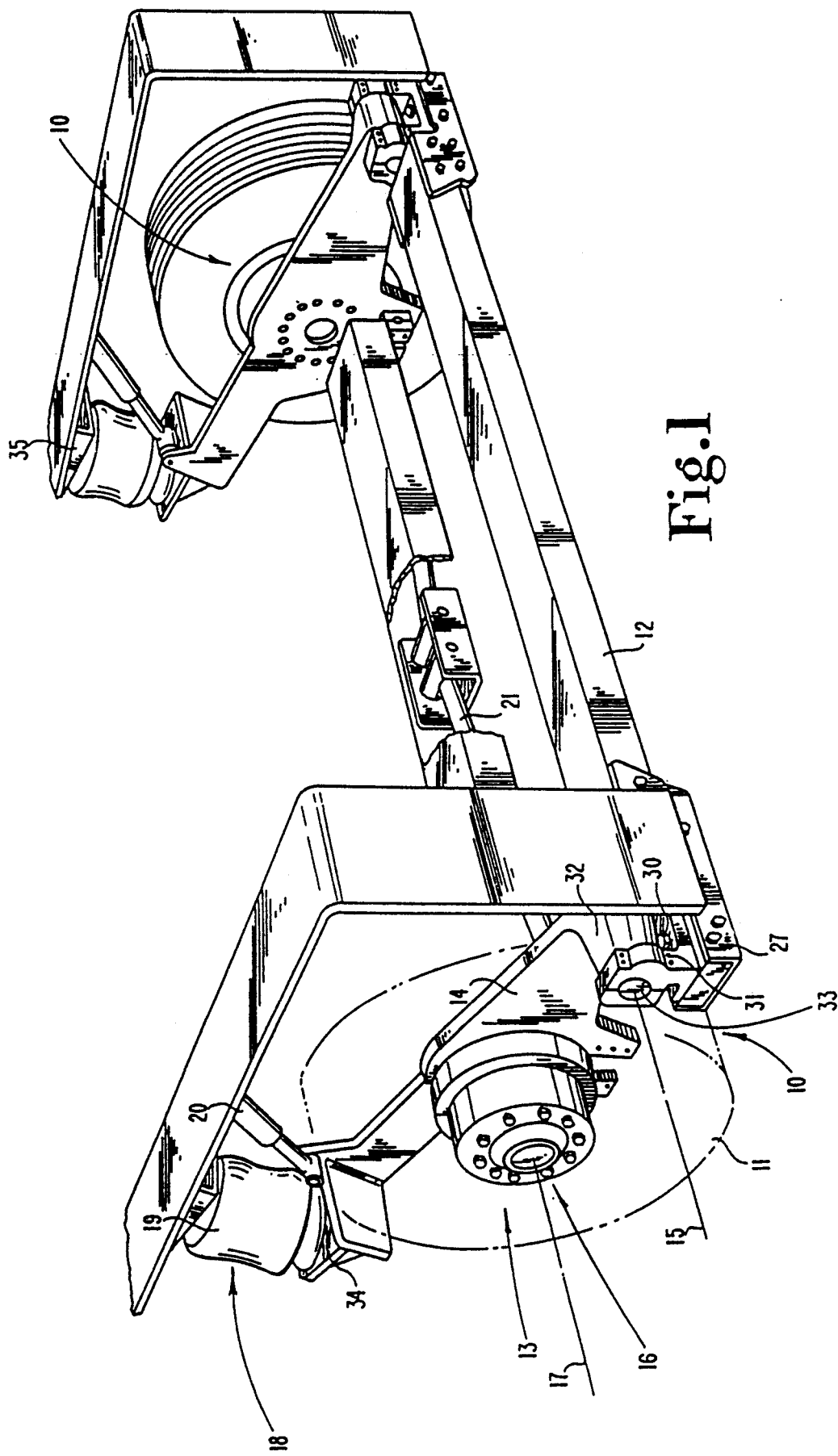
FIG. 1 is a perspective view showing a pair of wheel suspension systems constructed in accordance with the present invention and secured to a portion of a vehicle frame.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a wheel suspension system useful in a variety of applications. The system is characterized by having wheels which are mounted independently to a frame, and which are free to move upwardly to a position with the rotational axes of the wheels above the floor of the vehicle. The system is particularly advantageous in that it provides a low profile suspension that permits maximum width of the vehicle floor between the tires, while also permitting the floor of the vehicles to be lower than the axes of rotation for the wheels. The wheel suspension system is useful, for example, for mounting the wheels of a trailer, or for the rear wheels of a front-wheel drive vehicle, such as a van.

Referring in particular to the drawings, there is shown a wheel suspension system 10 constructed in accordance with a preferred embodiment of the present invention. System 10 is provided for mounting a wheel 11 to the frame 12 of a vehicle 13. The suspension system 10 includes a wheel support member 14 attached to the vehicle frame 12 and movable in an arcuate path, generally vertical in direction, about a horizontal pivot axis 15. Wheel mounting means 16 are provided for mounting the wheel 11 to the wheel support member 14 to be rotatable about a horizontal, rotation axis 17.

Figure 2:
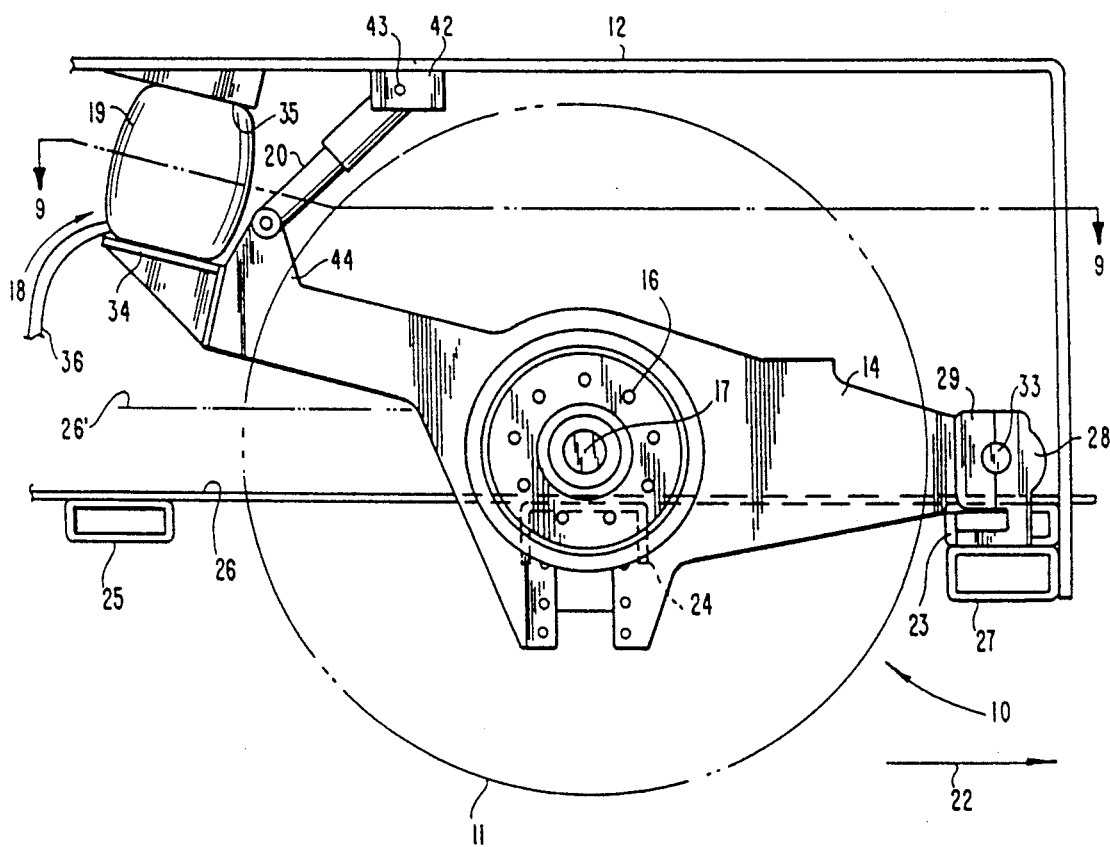
FIG. 2 is a side, elevational view of a wheel suspension system of the present invention, looking from the outside of the suspension.

The wheel support member 14 is movable between a first, uppermost position, and a second, lowermost position. Means 18 are provided for supporting the wheel support member in an intermediate position and for biasing the member to that position. Movement is permitted by the wheel support member 14 in the upward or downward directions, resisted by the biasing means. In one embodiment, the biasing means 18 comprises an airbag 19 positioned between a free end of the wheel support member and a portion of the frame 12, with compression or extension of the airbag accommodating upward and downward movement, respectively, of the wheel support member. The suspension system 10 may also preferably include a shock absorber 20 connecting between the wheel support member and the frame. As shown in FIG. 2, the preferred position for airbag 19, and a shock absorber 20, is at the trailing end of the wheel support member 14. Also, a trailer arm 21 connects the wheel support member, preferably at a location near the rotational axis of the wheel, with an interior portion of the vehicle frame 12 to provide lateral stability.

The wheel support member 14 is mounted to the vehicle frame 12 to permit vertical movement of a wheel supported thereon. In the preferred embodiment, the wheel support member 14 is a generally flat, elongated member attached at one end to the vehicle frame. The support member 14 is preferably attached at its front end, such that the wheel 11 is mounted behind the pivot axis 15 of the wheel support member when the vehicle moves in a forward direction 22 (FIG. 2). The wheel 11 is preferably mounted in about the middle region of the wheel support member 14.

The mounting of the wheel to the support member and of the support member to the vehicle frame is such that the rotation axis 17 for the wheel is movable to a position vertically above the plane of the vehicle floor. As shown in FIG. 2, the frame 12 may comprise one large weldment including transverse members, such as 23-25, upon which a floor 26 is mounted. The wheel support member 14 is shown in FIG. 2 in an intermediate position between its first, uppermost position and second, lowermost position. In a preferred embodiment, the rotation axis 17 is located above the floor 26 when the wheel support member 14 is in the intermediate position, corresponding to the at-rest position for the vehicle. The invention also contemplates that the rotation axis 17 may be at or below the level of the floor 26 in this at-rest position, but would be movable above the level of the floor when the wheel support member moves toward or reaches the uppermost position for the wheel. For example, the floor 26 could be located at an alternate, higher position 26' which would be above the at-rest position for the rotation axis 17, but below the rotation axis when the wheel and wheel support member move upwardly, compressing the airbag 19.

Attachment of the wheel support member 14 to the frame 12 may be accomplished in a variety of manner. As shown, the frame 12 includes a transverse member 23 of box tubing enclosed at the ends and supporting the floor 26. To obtain desired floor height and underbody clearance, enclosed box tubing supports 27 are secured by welding to the underside of transverse member 23. Mounting blocks 28 and 29 are secured to supports 27, with mounting block 28 being attached by means of bolts 30 (FIG. 1) and mounting block 29 being secured to block 28 also with bolts 31. Wheel support member 14 includes a sleeve-shaped portion 32 which is received over a shaft 33 held by the mounting blocks 28 and 29. The mounting blocks provide a yoke within which the sleeve 32 rotates about shaft 33, resulting in pivoting motion of the wheel support member relative the frame. A bearing, (not shown) particularly of elastomeric material, may be provided between sleeve portion 32 and shaft 33 to facilitate the pivoting movement.

Wheel 11 is mounted to the wheel support member 14 for rotation about a horizontal axis 17. As will be further discussed, it is desirable that the mounting means for the wheel maintain the desired low-profile configuration. The wheel mounting means may comprise, for example, a stub shaft or spindle upon which the wheel freely rotates. In certain applications, it is preferable to provide means for braking the wheel, and the wheel suspension system 10 will again accommodate a variety of customary mounting assemblies including braking components. The spindle 73 is secured to wheel support member 14 by bolts 74. The mounting portion of spindle 73 may be set at a slight angle, perhaps one-half degree to the axis of the spindle axle, which allows the wheel to be provided with a tie in or out or slope in or out, depending on the orientation of the spindle when mounted to the wheel support member.

At the rearward end of the wheel support member 14, there is provided an airbag mounting pad 34. An opposed mounting plate 35 is secured to the frame 12 and the mounting pad 19 is mounted between plates 34 and 35. In conventional fashion, the airbag 19, at a given pressure, will maintain the wheel and the wheel support member in a given at-rest position relative the frame. The airbag will function to accommodate both upward and downward movement of the wheel support member by compression or extension, respectively.

The airbag 19 is connected through air line 36 and via pneumatic control devices 38 (FIG. 4) to a suitable air reservoir for compressed air. In conventional fashion, the air pressure within the bag 19 is maintained by the valved communication of the airbag with the air reservoir through line 36.

Figure 4:
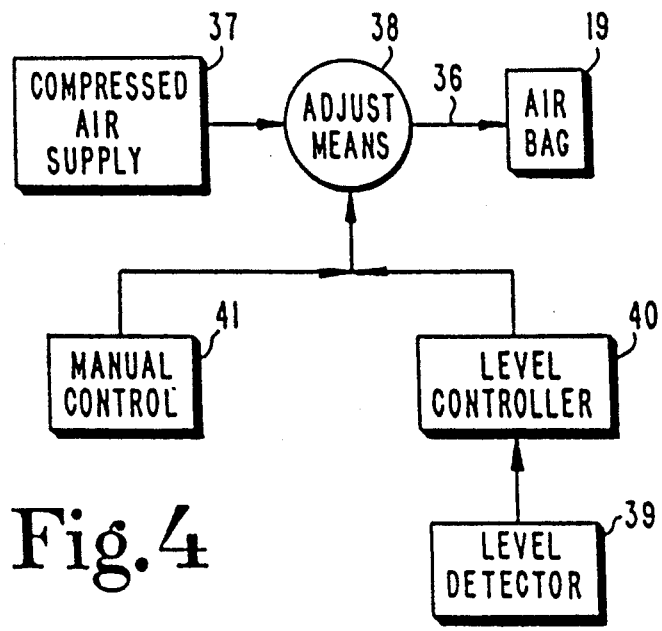
FIG. 4 is a schematic diagram showing means for controlling an airbag useful in conjunction with the present invention.

Referring to FIG. 4, two alternative methods of control for the airbag are shown schematically. The compressed air reservoir or supply 37 is connected through line 36 to the airbag 19. An adjustment means 38 controls the pressure of the air within the bag 19, and is capable of either increasing or decreasing air pressure as desired. A level detector 39 is operable to detect the position of the wheel support member 14 relative the frame 12. Information from the level detector is received by the level controller 40, which in turn operates the adjustment means 38 to regulate the pressure in the airbag. The pressure in the airbag is thereby automatically regulated to maintain a desired position or level of the wheel support member and wheel relative to the frame.

A separate manual control 41 may also be employed for regulating the airbag pressure. The manual control is connected to operate either in lieu of, or as an override to, the automatic level controller. In the event of failure of operation by the level controller 40, the manual control 41 permits the user to operate the adjustment means 38 to regulate air pressure within the bag 19, and therefore to control the position of the wheel relative the frame. In addition, operation of the manual control as an override to the level controller permits the user to intentionally vary the wheel position from that normally desired. Thus, the wheel support member 14 and wheel 11 may have a preferred position for normal road travel. However, it may be desirable in certain instances to lower the wheel relative the frame to obtain greater underbody clearance, or to raise the wheel relative the frame to bring the floor closer to the ground. The manual control 41 is operated as an override to the level controller 40 to obtain these variations in height of the vehicle, as desired.

The control system is preferably designed to permit all of the foregoing automatic and manual operations, as well as others. Individual air bags may be controlled by separate bleed-off valves. The air bags may be simultaneously controlled by a single, remote control operated, for example, by an electrical solenoid valve. Provision may also be made for isolation of the automatic leveling valves, as desired. A particular feature of the present invention is that individual or opposed pairs of wheels may be lifted form the road surface in appropriate circumstances. For example, in a vehicle having three pairs of wheels suspended by the present invention, on of the outer pairs of wheels, such as the two rearwardmost wheels, may be lifted from the road surface for sharp turns of the vehicle, thus reducing the "scrubbing" that would occur as a result of the wheels being rubbed sideways along the road surface during the turn.

Shock absorber 20 is connected at one end with the frame 12 and at the other end to the rear portion of the wheel support member 14. Frame 12 includes a tab 42 to which shock absorber 20 is connected by means of a bolt 43. Wheel support member 14 includes an ear 44 to which the other end of the shock absorber 20 is connected by means of a bolt 45.

Arm means 46 are provided for connecting the wheel support member 14 to the vehicle frame 12, supplementary to the previously described points of attachment. An arm 47 connects preferably between an interior location on the frame 12 beneath the floor 26 and a position on the wheel support member separate from the wheel rotation axis 17 and the wheel support member pivot axis 15. Arm 47 is shown secured to wheel support member 14 proximate to the rotation axis 17.

Figure 5:
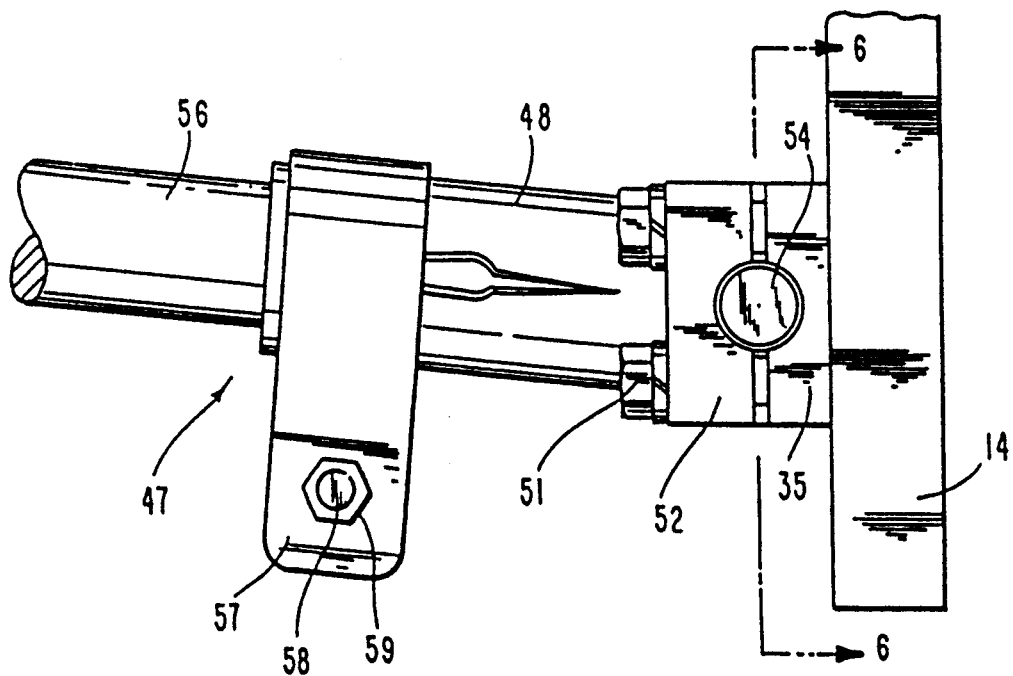
FIG. 5 is a partial, side elevational view showing the attachment of a trailing arm with a wheel support member useful in the present invention.
Figure 6:
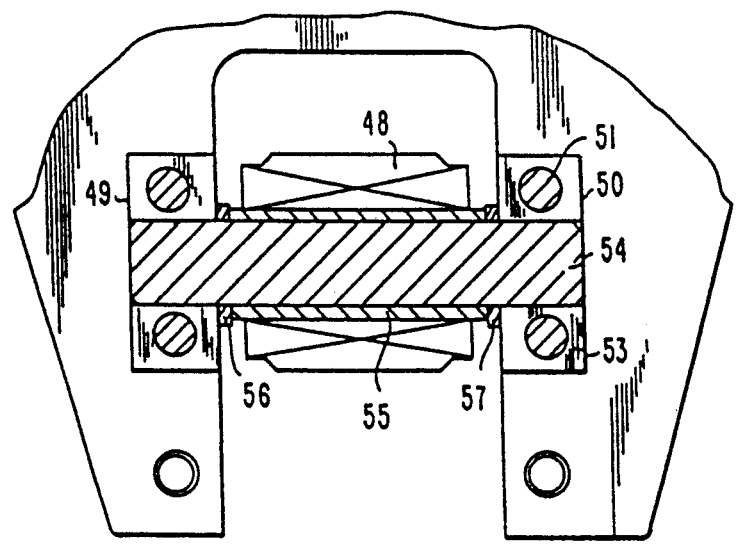
FIG. 6 is an end, cross-sectional view of the trailing arm and wheel support member of FIG. 5, taken along the line 6—6 and looking in the direction of the arrows.

More specifically, arm 47 connects with the wheel support member below transverse frame member 24. Arm 47 includes a sleeve portion 48 received about a shaft mounted by pillow blocks 49 and 50 secured to the wheel support member by bolts 51. As shown in FIGS. 5 and 6, each of the pillow blocks comprises a pair of opposed, C-shaped components 52 and 53 between which is received the shaft 54. A bushing 55 is received over shaft 54 and held in position by spacer bushings 56 and 57. Sleeve shaped portion 48 is received over bushing 55.

Shown particularly in FIG. 5, the arm 47 comprises a rod 56 and a separate sleeve shaped portion 48. Sleeve portion 48 includes a split construction received over the rod 56 and clamped tightly thereon by means of a collar 57, bolt 58 and nut 59.

Figure 7:
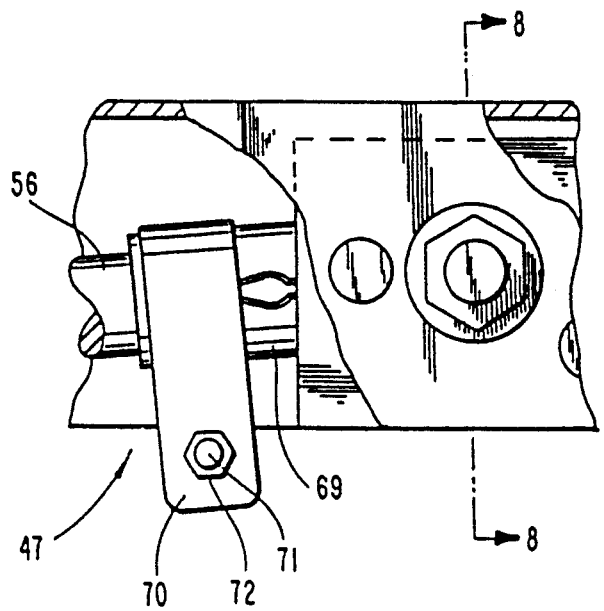
FIG. 7 is a partial, side elevational view showing the connection of a trailing arm with the underside of a vehicle frame in accordance with the present invention.
Figure 8:
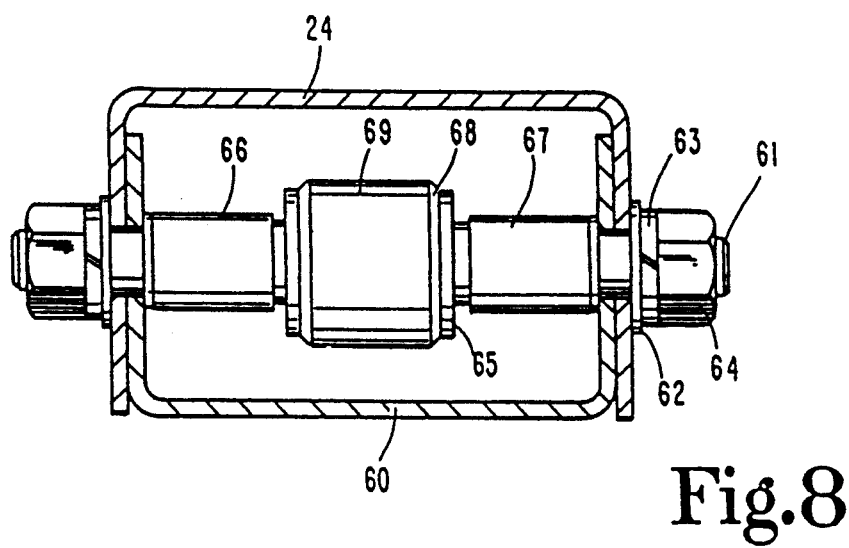
FIG. 8 is an end view, partially in cross-section, showing the connection of the trailer arm and vehicle frame connection of FIG. 7, taken along line 8—8 and looking in the direction of the arrows.

The interior mounting of the trailing arm 47 is shown particularly in FIGS. 7 and 8. Transverse member 24 comprises a downwardly-facing U-shaped member. An upwardly-facing U-shaped member 60 is included in the area of the interior attachment for the arm 47 to help protect this location from exposure on the underside of the vehicle. A double-threaded shaft 61 extends through the transverse members 24 and 60 and is secured at each end by means of a flat washer 62, split lockwasher 63 and hexagonal nut 64. Interior of the U-shaped members, a steel bushing 65 is received on the shaft 61 between a pair of spacer bushings 66 and 67, and a rubber bushing 68 is received over the center bushing 65. The interior end of the trailing arm 47 includes a sleeve-shaped portion 69 which is received over the rubber bushing 68. The nuts 64 are tightened to secure the assembly and prevent rotation of the center bushings. As shown in FIG. 7, the interior end of arm 47 is similar to that for the exterior portion in that the arm comprises the split member 69 received over the rod 56 and secured by a collar 70, bolt 71 and nut 72.

It will be appreciated that the outside end of the arm 47 moves in an arcuate path as the wheel support member pivots up and down about the axis 15. The path of the outer end of the arm is a combination of the arc defined by pivoting around the axis 15, and also the arc defined by pivoting around the central attachment shaft 54. Consequently, the U-shaped channel 24 is sized sufficiently wide to accommodate forward and rearward movement of the outer end of the arm 47 as it pivots with the wheel support member. The described attachment of the ends of the arm 47 is designed to accommodate this compound movement by the exterior end of the arm. It will further be appreciated that the nature of the movement of the arm is affected by various factors, including the length of the radius of movement. Thus, attachment of the exterior end of the arm in the center region of the wheel support member results in less movement of the arm 47 than would occur if it were attached at the extreme rearward end of the wheel support member. In the same manner, making the arm 47 longer results in a less severe arcuate movement of the end as it pivots up and down about the shaft 54. Various methods and locations of attachment for the arm means 46 would provide suitable lateral stabilization of the wheel support member. The preferred embodiment shown in the drawings represents a compromise which provides excellent stability in mounting and facilitates attachment.

Figure 9:
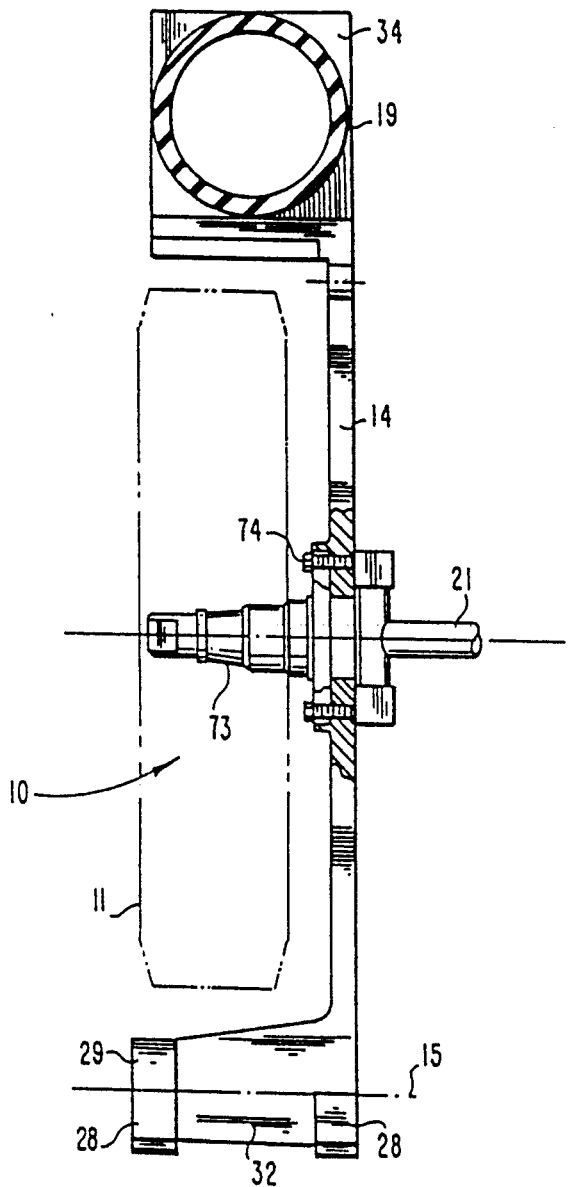
FIG. 9 is a top, plan view showing the wheel suspension system of the present invention, and particularly showing the compact profile of the system.

As shown in FIG. 9, the suspension system 10 is preferably arranged with the sleeve-shaped portion 32, wheel 11 supported on spindle 73, and airbag 19 in longitudinal alignment. The sleeve-shaped portion 32 of wheel support member 14 provides a means for attaching the wheel support member 14 to the vehicle frame 12 as previously described. Pivoting of the wheel support member occurs about horizontal axis 15. The wheel 11 is mounted to the wheelsupport member 14 by a conventional wheel mounting means, such as a brake drum assembly mounted with spindle 73. Spindle 73 is in turn secured to wheel support member 14, such as by bolts 74. Wheel 11 is thereby mounted for rotation about horizontal axis 17. Means are also provided for maintaining the wheel support member in a desired vertical position, while permitting rotation about the axis 15 in response to external forces such as uneven road surfaces. This means is provided in the preferred embodiment by the airbag 19 mounted to the airbag pad 34 and operating in a conventional fashion as a support cushion for the wheel support member relative the frame. It is therefore seen that the three primary locations for force transfers to or from the wheel support member are the mounting sleeve 32, spindle 73, and airbag 19, and these three are longitudinally aligned as depicted in FIG. 9. This alignment provides various advantages. First, the alignment enhances the ability of the wheel support member to receive and distribute forces. Second, the alignment provides a compact arrangement for these various components, thus requiring a minimum of lateral space for suspension of the wheel.

Referring to FIG. 1, an embodiment is shown in which a vehicle 13 includes a pair of wheel suspension systems 10, one on each side of the vehicle 13. Due to the configuration of the wheel suspension systems 10, each of the wheel support members 14 is movable between a first, uppermost position, corresponding with compression of the airbag 19, and a second, lowermost position, corresponding with extension of the airbag 19.

When the wheel support member is in the uppermost position, the floor 26 is at its lowest position relative the surface upon which the wheels are supported. The at-rest level of the vehicle floor relative the support surface is a product of several factors, namely the desired road clearance for the vehicle underbody, the thickness of the underbody frame and the floor, and the adjustment of the wheel support member through the air bag or the like. For example, desired road clearance may be in the range of 10–12 inches; frame thickness may be about 3–4 inches; and, floor thickness may be from one and three-eighths inches to one and three-fourths inches. With these dimensions, it is seen that the wheel suspension system of the present invention may be designed by combination of the above parameters to have the floor surface at most about sixteen inches, or even at most about twelve inches, above the support surface when the wheel support member is in the uppermost position. In a preferred embodiment, a combination of 12 inches of road clearance, a 4 inch frame, and a one and three-eighths inches floor yields a floor height of seventeen and three-eighths inches above the road surface. With the air bag compressed and the floor at the lowest level, the top surface of the floor may typically be about two and one-half inches lower. This permits manual or automatic control of the suspension system which can vary the at-rest floor height by several inches, higher or lower. At the same time, the compactness of the wheel suspension systems 10 provides a substantial space between the wheels. Even with the restrictions on outer dimensions for highway vehicles, the compactness of the wheel suspension systems 10 permits the distance 75 (FIG. 1) between the wheels 11 to easily exceed about six and a half feet.

Figure 10:
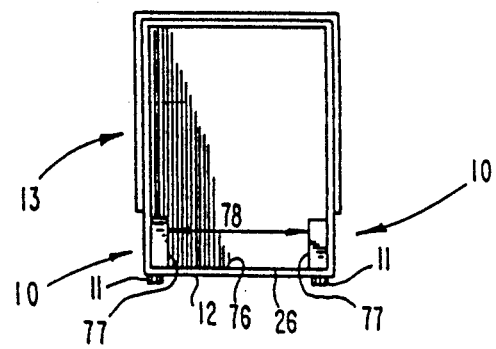
FIG. 10 is a rear end view of a trailer incorporating the wheel suspension systems of the present invention.

Referring to FIG. 10, there is shown a vehicle 13 having wheel suspensions 10 mounting wheels 11 to the vehicle frame 12. As represented in FIG. 10, the upper surface 76 of floor 26 is relatively close to the ground, substantially closer than has been the case for vehicles of the prior art. As indicated, the distance between the wheels 11 may be more than about 8 feet for a vehicle of this type. The rotational axes for the two wheels 11 are preferably co-linear, although this is not required. It will be appreciated that a vehicle 13 will have wheel wells including walls 77 covering the wheel suspension systems. The suspensions are sufficiently compact that the distance 78 between the walls 77 may be about 6 feet 6 inches or more. This is particularly notable since this span permits the loading of a variety of materials into the vehicle 13 which require this amount of space.

Figure 11:
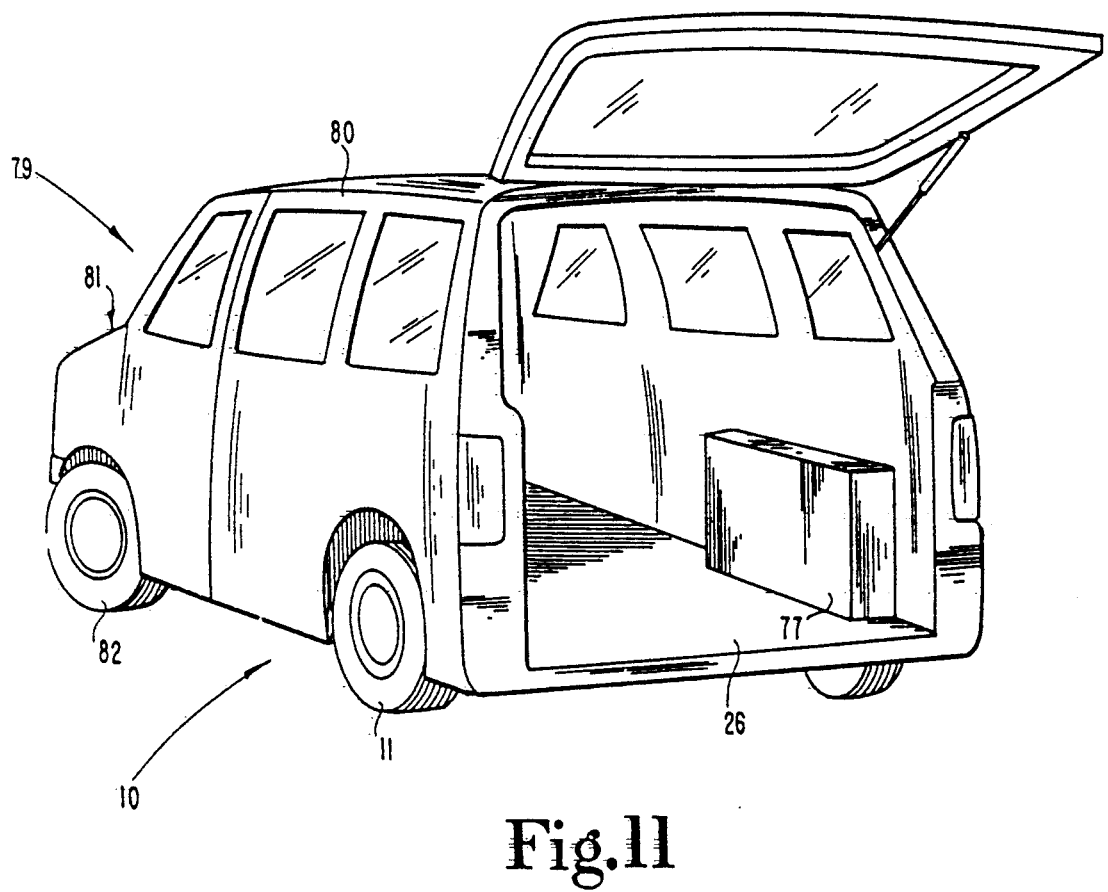
FIG. 11 is an perspective view of a van including the wheel suspension systems of the present invention.

One advantageous application of the wheel suspension system of the present invention is in a front-wheel drive vehicle, such as a pick-up truck or a mini-van 79 shown in FIG. 11. Use of the wheel suspensions 10 for the rear wheels 11 permits the van 79 to be constructed with a substantially lower floor 26 than is true of commercial vehicles currently available. The lower floor increases cargo capacity in terms of cubic footage, without requiring the van to be either wider or higher than in the past. Also, the lower floor makes loading much easier and more convenient. The compact wheel suspensions provide a maximum span between the walls 77 to permit optimal utilization of the floor space in the mini-van even with the floor positioned below the wheel axles. Plywood and other materials measuring 4' in width can be loaded onto the floor 26 without interference from the wheel suspensions. This has been possible in prior art vehicles only by requiring that the cargo floor be maintained above the through axle for the rear wheels, thus requiring a higher floor that is more difficult to load, and has a more restricted cargo space.

With these desirable improvements over the standard pick-up truck or mini-van, it will at the same time be appreciated that the remaining portions of the truck or van, forward of the cargo area, are unaffected by the wheel suspension systems of the present invention. Thus, the passenger area 80, engine compartment 81 and driven front wheels 82 may be constructed in accordance with mini-van designs of the prior art.

Figure 12:
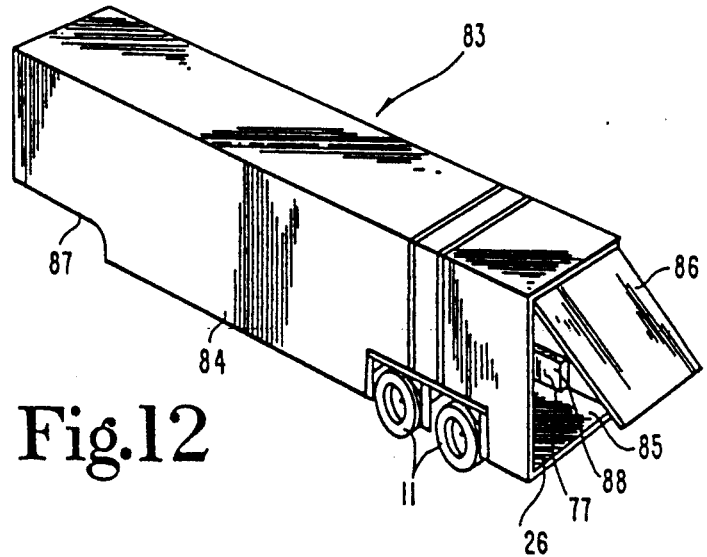
FIG. 12 is a perspective view of a semi-trailer incorporating two pairs of wheel suspension systems in accordance with the present invention.
Figure 13:
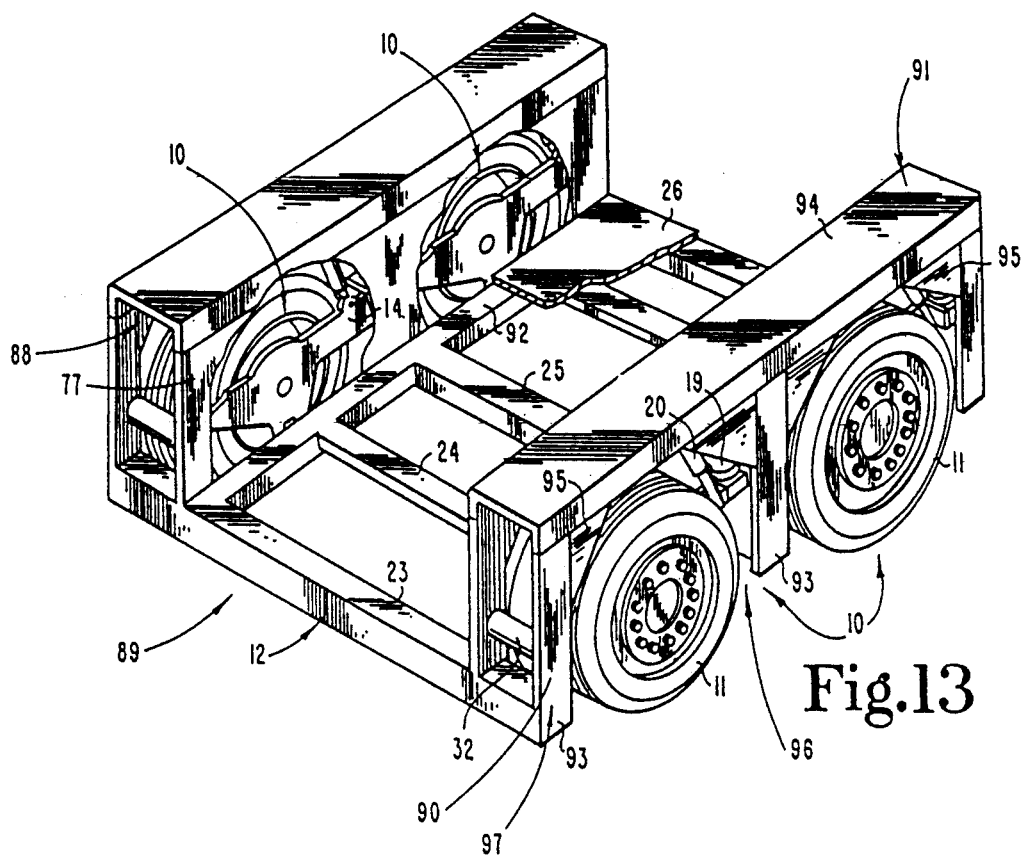
FIG. 13 is a perspective view of a portion of a vehicle, showing the mounting of the wheel suspension systems of the present invention to the vehicle frame.

An alternate use for the wheel suspension system of the present invention is shown in FIGS. 12 and 13. In FIG. 12, there is shown a large cargo capacity configuration for a trailer 83, preferably a semi-trailer, which can be achieved by the present invention. The trailer body 84 is characterized by having the floor 26 of cargo space 85 quite low and close to the surface of the roadway, e.g. 16–18" from the roadway. Access to the cargo space 85 is provided by a door 86 at the rear of the trailer. The trailer body 84 is further characterized in that the floor 26 is flat and continuous from the rear of the trailer to the step-up 87 at the front of the trailer which accommodates the fifth wheel assembly of a tractor (not shown).

The floor 26 of trailer 83 narrows somewhat where the body 84 is provided with wheel wells 88 having mutually-facing walls 77 as previously described. Apart from this narrowing for the wheel wells, however, the trailer 83 of the present invention may have a substantially flat and continuous floor positioned very close to the roadway surface and beneath the rotational axes of the pairs of wheels 11. Compared to the conventional trailers used for road and rail transport, the floor disposition of the trailer 83 results in as much as a twenty-five percent increase in volume of the cargo space 85. Moreover, all of that space can be loaded with a forklift truck entering the space 85 from the rear of the trailer and running on the flat floor 26.

Prior art trailers have been known which included a portion forward of the rear wheels 11 that extend downwardly relatively close to the roadway. However, these trailers did not provide a loading floor that was continuous from the rear end of the trailer as afforded by the present invention. Instead, access to this lowered center portion of the trailer was made either through access doors through the normal trailer floor, above the wheels, or by doors along the side providing access from outside of the trailer. This space for such trailers is substantially less desirable than in the case of the present invention for several reasons. First, the present invention provides even greater overall cargo space than available with this prior art design. Second, all of the cargo space for the present invention is readily accessible from the rear of the trailer, and is not divided into compartments which restrict its use in terms of the size of items which may be placed therein. Third, access to this lower compartment of the prior art, from either the interior floor or the outside doors, is less desirable for purposes of loading and unloading. The advantages of the trailer 83 provided by the present invention will be readily apparent to those skilled in the art, particularly those familiar with prior art designs that provided this adjoining cargo compartment.

Figure 3:
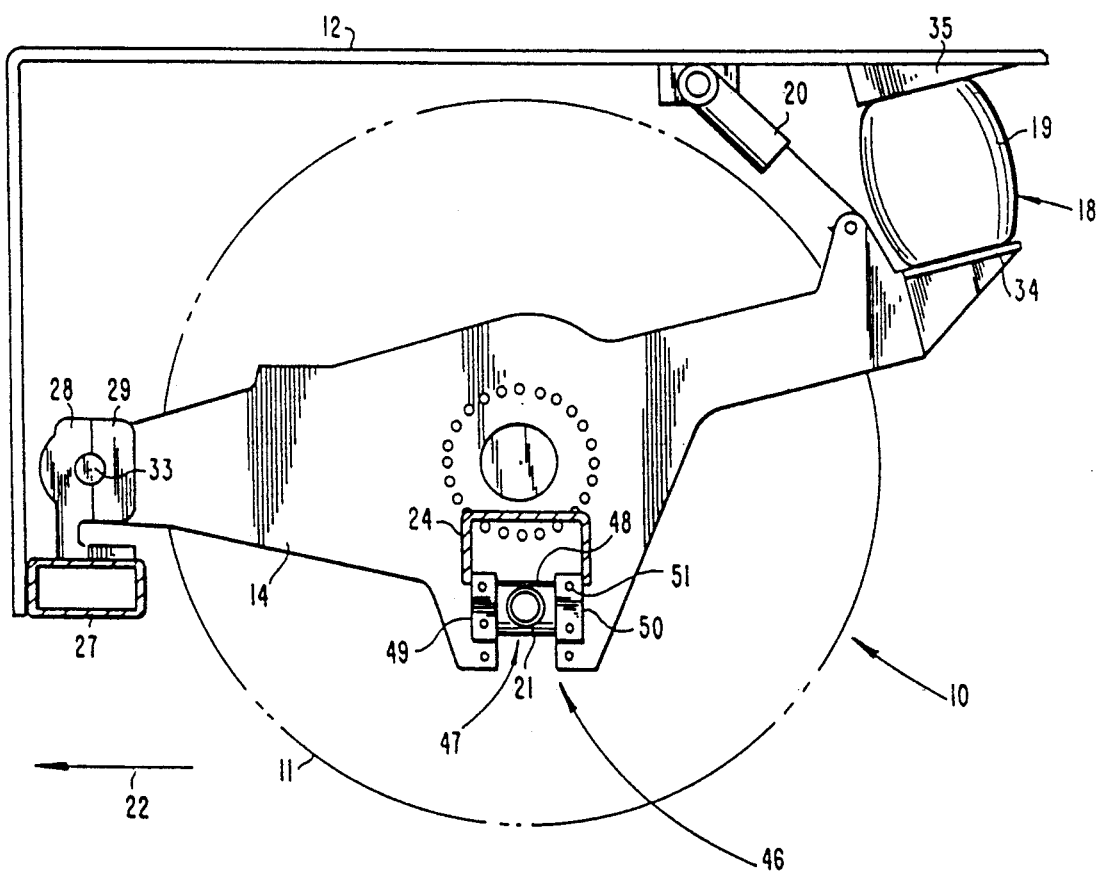
FIG. 3 is a side, elevational view of the wheel suspension system of FIG. 2, looking from the inside.

In FIG. 13 there is shown, somewhat schematically, an assembly of four wheel suspension systems 10 in accordance with the present invention. These systems 10 are shown in FIG. 13 in somewhat of a self-contained assembly. It will be appreciated, however, that the interrelationship of the wheel suspension systems with the vehicle frame and body may vary, with the suspension systems and associated supporting framework being somewhat modular, as suggested by FIG. 13, or fully integral with the remaining portion of the vehicle. The suspension apparatus 89 includes four separate wheel suspension systems 10 which are secured to associated framework in the same fashion as indicated with respect to FIGS. 1-3. In addition, the apparatus 89 is shown as including a pair of wheel wells 88 including interior walls 77, exterior walls 90 and top walls 91. The framework 12 includes a series of transverse frame members 23-25 upon which is located the floor 26.

The overall suspension apparatus 89 is therefore shown as having a generally U-shaped configuration, with the frame 12 and floor 26 extending horizontally between the two upstanding wheel wells 88. The trailer body, such as 84 (FIG. 12), is constructed and securely affixed to the apparatus 89 in the wheel well regions 88 of the trailer body 84.

The assembly 89 must be of sturdy construction in order to independently suspend the four wheels 11. Also, similar constructions may be utilized in either the two wheel or later-described six-wheel embodiment. To provide the desired strength and rigidity for the assembly 89, while keeping the weight of the apparatus to a minimum, use can be made of tubular or hollow components. For example, the transverse structure of the frame 12 is preferably fabricated of transverse tubular or U-shaped members, such as 23-25, as previously described. Longitudinal tubular members, such as 92, may also be employed. These members are welded together to provide a strong, light structure.

Each of the upright wheel structures 88 are also fabricated to provide strength with light weight. Wheel wells 88 have vertical support members 93 positioned ahead of and behind each wheel 11, and these members are joined by horizontal support members 94 extending above wheels 11. Triangular reinforcing plates 95 connect to the vertical supports 93 and horizontal supports 94, and define therewith wheel openings 96 at the exterior of the assembly. Transverse reinforcing members, such as 97, connect the vertical supports 93 with the interior walls 77 and provide increased strength.

It is clear from the embodiments of FIGS. 10-13 that the wheel suspension systems 10 of the present invention provide a compact assembly that incorporates a vehicle floor that is relatively close to the ground, and which provides maximum width between the wheels. In the embodiment of FIG. 13, for example, the members making up the upright wheel well structures 88 are disposed at least in part, and preferably are almost entirely, above the tracks of the wheels on the road surface. In other words, the transverse extent of each upright structure is little more than the transverse extent of the wheels 11 therein. As such, the upright structures 88 constitute minimum encroachment into the cargo space 85.

As previously indicated, each of the wheels 11 is resiliently and independently suspended within one of the wheel wells 88 of frame 12. Pneumatic or other suspension means are preferably employed as previously described. The suspension systems 10 preferably include a generally triangular-shaped wheel support member 14 which is pivotally supported at its forward end by a sleeve-shaped portion 32 received over an elastomeric bushing (not shown) surrounding a pin 33, which acts also as a transverse reinforcing member extending between the outer vertical supports 93 and the inner wall 77. The wheel 11 and the airbag 19 are also received between the vertical supports 93 and interior wall 77. Consequently, these three components of the wheel suspension system 10 are in longitudinal alignment within the wheel wells 88.

The four wheels 11 of FIG. 13 are mounted for independent suspension upon the frame 12. Although not required, the wheel support members 14 are preferably positioned to have the pivot axis co-linear for opposed pairs of assemblies. When the wheels roll over rough or uneven terrain, each wheel support member will pivot about its respective pivot pin 15, compressing or extending the associated airbag. Airbag 19 and shock absorber 20 absorb the forces acting on the wheel so they are not fully transmitted to the trailer body or its contents.

Figure 14:
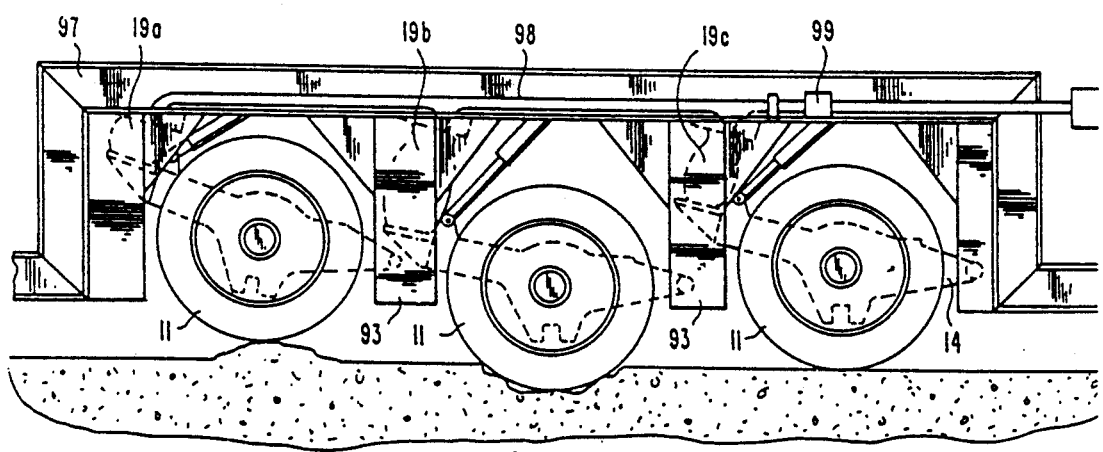
FIG. 14 is a side, somewhat schematic view showing an arrangement of three pairs of wheel suspension systems of the present invention mounted to a trailer or like vehicle, and particularly showing the inner-connection of the airbags useful with the suspensions.

Another embodiment of the present invention is shown in FIG. 14, in which three pairs of wheels 11 are suspended from a trailer 97. The wheel support members 14 are supported by the frame in the same manner as previously described. Also shown, somewhat diagrammatically in FIG. 14 is the operation of the airbags 19 in supporting the wheels relative the frame. Airbag 19A is shown in a compressed condition with the wheel support member elevated as tire 11 rides over a bump in the road. Airbag 19B is in an extended condition as its associated wheel 11 has dropped into a recess in the road. Airbag 19C is shown in the intermediate position corresponding with its associated wheel 11 resting normally upon the road surface. Also shown in FIG. 14 is the inner-connection of the airbags 19A–C by means of a conduit 98.

Air under pressure from a compressor (not shown) is fed into a storage chamber, such as one of the hollow, transverse tubular members of the frame. The compressed air is conveyed to a valve 99 which communicates with the conduit 98. Sensing means is used to operate the valve in the manner as described with respect to FIG. 4. As will be appreciated, an increase in the air pressure within bags 19A–C will cause the bags to extend, lifting the trailer upwardly from the road surface. Similarly, a decrease in the pressure will lower the trailer relative the road surface. In addition, the individual wheels and wheel suspension systems can be operated independently, if desired. For example, a wheel could be lifted from the road surface with full contraction of the associated airbag. This could be done in pairs or an individual wheel could be lifted from the road surface, for example in the instance of a flat tire. Further description of an airbag system useful in accordance with the present invention is contained in our co-pending U.S. patent application Ser. No. 172,695, filed on Mar. 23, 1988, now U.S. Pat. No. 4,878,691, and that description is specifically incorporated herein by reference.

The present invention is useful in a variety of applications, including those already described and shown. The wheel suspension systems may be used individually, or preferably in pairs, for both powered vehicles and trailers The powered vehicles would desirably have front wheel drive, with the wheel suspension systems of the present invention being used to mount the rear wheels to provide enhanced cargo area. However, the wheel suspension systems of the present invention could be used to support the front wheels, or could also be modified to support engine-driven wheels. Various types of trailers can also be constructed usefully with the present invention. The trailers could range from a two-wheeled trailer to one having two, three or more pairs of wheels supported by the suspension system of the present invention. The wheels are mounted for independent movement, although pairs are preferably mounted to have normally co-linear axes. For any of the possible embodiments, the wheel suspension systems can be used to provide a vehicle floor that has maximum span between the wheels, and which is relatively close to the road surface, ranging perhaps from only about 12 inches, with the air bag collapsed, up to at most about 18".

Certain variations in the construction and configuration of the wheel suspension systems are contemplated as falling within the scope of the present invention. Broadly speaking, the wheels are mounted for vertical movement to an extent that the axis of wheel rotation can begin or be moved to a position above the floor of the supported vehicle. The mounting means preferably comprises a wheel support member which is pivotally attached at its forward end to the vehicle frame, and which has a biasing means to maintain the wheel support in a pre-selected position, although movable upwardly and downwardly therefrom. Airbags are generally known in the trailer art and are preferred for use in the present invention, although leaf springs or other resilient means could be employed.

The wheels may be supported on the wheel support members by a variety of conventional stub axle or spindle arrangements, which may employ standard type drum or other braking systems. Lateral stability for the wheels is enhanced by the use of the arms, such as 21, which extend from the wheel support member to the vehicle frame, preferably in the center region on the underside of the frame. Other stabilization means could be equally employed, such as bearing pads or surfaces positioned against portions of the wheel support member. Examples of alternate thrust bearing means are contained in our co-pending patent application, previously cited, and the descriptions thereof are incorporated by reference.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A wheeled vehicle for movement along a support surface, said wheeled vehicle including at least one pair of first and second wheels positioned on opposite sides of the vehicle and being secured thereto, which comprises:

a vehicle body including a planar floor;
first and second wheel support members;
first attachment means for attaching said first wheel support member to one side of said vehicle body to be movable in a vertical direction about a first, horizontal pivot axis, said first wheel support member being movable between a first, uppermost position and a second, lowermost position;
second attachment means for attaching said second wheel support member to the other side of said vehicle body to be movable in a vertical direction about a second, horizontal pivot axis, said second wheel support member being movable between a first, uppermost position and a second, lowermost position;
first and second wheels;
first wheel mounting means for mounting said first wheel to said first wheel support member to be rotatable about a first horizontal, pivot axis, the rotation axis of said first wheel being vertically above the floor when said first wheel support member is in its first, uppermost position;
second wheel mounting means for mounting said second wheel to said second wheel support member to be rotatable about a second, horizontal rotation axis, the rotation axis of said second wheel being vertically above the floor when said second wheel support member is in its first, uppermost position;
first biasing means for biasing said first wheel support member to an intermediate position between the first and second positions and permitting resisted movement of said first wheel support member away from the intermediate position; and
second biasing means for biasing said second wheel support member to an intermediate position between first and second positions and permitting resisted movement of said second wheel support member away from the intermediate position;
said first and second attachment means including first and second arm means, respectively, for connecting said first and second wheel support members to the vehicle frame to provide lateral stabilization of said first and second wheels, said first and second arm means connecting with said first and second wheel support members at locations displaced from the first and second rotation axes and the first and second pivot axes, respectively.

2. The vehicle of claim 1 in which the first and second pivot axes are co-linear.

3. The vehicle of claim 2 in which said first and second attaching means permit independent movement of said first and second wheel support members.

4. The vehicle of claim 2 in which said floor has a top surface, the top surface being at most sixteen inches above the support surface when both of said first and second wheel support members are in their uppermost positions.

5. The vehicle of claim 2 in which the top surface is at most about twelve inches above the support surface when both of said wheel support members are in their uppermost positions.

6. The vehicle of claim 2 in which the distance between the closest portions of said first and second wheels is more than about six and a half feet.

7. The vehicle of claim 2 in which the only wheels of the vehicle are said first and second wheels.

8. The vehicle of claim 2 in which said first and second wheels are non-driven wheels, and in which the only non-driven wheels of the vehicle are said first and second wheels.

9. The vehicle of claim 1 which includes at least a second pair of third and fourth wheels positioned on opposite sides of the vehicle and being secured thereto, and which further includes:

third and fourth support members;
third and fourth attachment means for attaching said third and fourth wheel support members, respectively, to the opposite sides of said vehicle body to be movable in a vertical direction about third and fourth horizontal pivot axes, each of said third and fourth wheel support members being movable between a first, uppermost position and a second, lowermost position;
third and fourth wheels;
third and fourth wheel mounting means for mounting said third and fourth wheels, respectively, to said third and fourth wheel support members to be rotatable about third and fourth horizontal rotation axes, the axis of rotation of each of said third and fourth wheels being vertically above the floor when said third and fourth wheel support members, respectively, is in its first, uppermost position; and
third and fourth biasing means for biasing each of said third and fourth wheel support members, respectively, to an intermediate position between its first and second positions and permitting resisted movement of said third and fourth wheel support members, respectively, away from its intermediate position;
said third and fourth attachment means including third and fourth arm means, respectively, for connecting said third and fourth wheel support members to the vehicle frame to provide lateral stabilization of said third and fourth wheels, said third and fourth arm means connecting with said third and fourth wheel support members at locations displaced from the third and fourth rotation axes and the third and fourth pivot axes, respectively.

10. The vehicle of claim 9 in which the first and second pivot axes are co-linear and the third and fourth pivot axes are co-linear.

11. The vehicle of claim 10 in which said attaching means permit independent movement of said first through fourth wheel support members.

12. The vehicle of claim 10 in which said floor has a top surface, the top surface being at most sixteen inches above the support surface when each of said first through fourth wheel support members is in its uppermost position.

13. The vehicle of claim 10 in which the top surface is at most about twelve inches above the support surface when each of said wheel support members is in its uppermost position.

14. The vehicle of claim 10 in which the distance between the closest portions of said first and second wheels is more than about six and a half feet, and the distance between the closest portions of said third and fourth wheels is more than about six and a half feet.

15. The vehicle of claim 10 in which the only wheels of the vehicle are said first through fourth wheels.

16. The vehicle of claim 10 in which said first through fourth wheels are non-driven wheels, and in which the only non-driven wheels of the vehicle are said first through fourth wheels.

17. The vehicle of claim 9 which includes at least a third pair of fifth and sixth wheels positioned on opposite sides of the vehicle and being secured thereto, and which further includes:

fifth and sixth support members;
fifth and sixth attachment means for attaching said fifth and sixth wheel support members, respectively, to the opposite sides of said vehicle body to be movable in a vertical direction about fifth and sixth horizontal pivot axes, each of said fifth and sixth wheel support members being movable between a first, uppermost position and a second, lowermost position;
fifth and sixth wheels;
fifth and sixth wheel mounting means for mounting said fifth and sixth wheels, respectively, to said fifth and sixth wheel support members to be rotatable about fifth and sixth horizontal rotation axes, the axis of rotation of each of said fifth and sixth wheels being vertically above the floor when said fifth and sixth wheel support members, respectively, is in its first, uppermost position; and
fifth and sixth biasing means for biasing each of said fifth and sixth wheel support members, respectively, to an intermediate position between its first and second positions and permitting resisted movement of said fifth and sixth wheel support members, respectively, away from its intermediate position;
said fifth and sixth attachment means including fifth and sixth arm means, respectively, for connecting said fifth and sixth wheel support members to the vehicle frame to provide lateral stabilization of said fifth and sixth wheels, said fifth and sixth arm means connecting with said fifth and sixth wheel support members at locations displaced from the fifth and sixth rotation axes and the fifth and sixth pivot axes, respectively.

18. The vehicle of claim 17 in which the first and second pivot axes are co-linear, the third and fourth pivot axes are co-linear, and the fifth and sixth pivot axes are co-linear.

19. The vehicle of claim 18 in which said attaching means permit independent movement of said first through said sixth wheel support members.

20. The vehicle of claim 18 in which said floor has a top surface, the top surface being at most sixteen inches above the support surface when each of said first through sixth wheel support members is in its uppermost position.

21. The vehicle of claim 18 in which the top surface is at most about twelve inches above the support surface when each of said wheel support members is in its uppermost position.

22. The vehicle of claim 18 in which the distance between the closest portions of said first and second wheels is more than about six and a half feet, the distance between the closest portions of said third and fourth wheels is more than about six and a half feet, and the distance between the closest portions of said fifth and sixth wheels is more than about six and a half feet.

23. The vehicle of claim 18 in which the only wheels of the vehicle are said first through sixth wheels.

24. The vehicle of claim 18 in which said first through sixth wheels are non-driven wheels, and in which the only non-driven wheels of the vehicle are said first through sixth wheels.

25. The vehicle of claim 1 in which said first attachment means, said first biasing means and said first wheel are longitudinally aligned, and in which said second attachment means, said second biasing means and said second wheel are longitudinally aligned.

26. The vehicle of claim 1 in which said wheel support member is a substantially flat plate having a sleeve-shaped portion at one end for pivotal mounting to said frame and a wheel spindle secured to one side of the plate for mounting of said wheel.

* * * * *